(12) United States Patent
Liu et al.

(10) Patent No.: US 11,467,844 B2
(45) Date of Patent: Oct. 11, 2022

(54) STORING MULTIPLE INSTRUCTIONS IN A SINGLE REORDERING BUFFER ENTRY

(71) Applicant: ALIBABA GROUP HOLDING LIMITED, Grand Cayman (KY)

(72) Inventors: Chang Liu, Shanghai (CN); Ruqin Zhang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 17/024,032

(22) Filed: Sep. 17, 2020

(65) Prior Publication Data

US 2021/0089321 A1 Mar. 25, 2021

(30) Foreign Application Priority Data

Sep. 23, 2019 (CN) .......................... 201910900700.9

(51) Int. Cl.
*G06F 9/38* (2018.01)

(52) U.S. Cl.
CPC .......... *G06F 9/3855* (2013.01); *G06F 9/3818* (2013.01)

(58) Field of Classification Search
None
See application file for complete search history.

(56) References Cited

U.S. PATENT DOCUMENTS

| | | | |
|---|---|---|---|
| 6,550,002 B1* | 4/2003 | Davidson | G06F 9/3836 712/216 |
| 10,007,521 B1* | 6/2018 | Tam | G06F 9/384 |
| 2010/0011166 A1 | 1/2010 | Yu et al. | |
| 2010/0100708 A1 | 4/2010 | Ukai | |
| 2010/0333098 A1* | 12/2010 | Jordan | G06F 9/384 718/103 |
| 2014/0032884 A1 | 1/2014 | Krishna et al. | |
| 2014/0351565 A1 | 11/2014 | Hansen et al. | |
| 2016/0357554 A1* | 12/2016 | Caulfield | G06F 9/3836 |
| 2017/0168544 A1* | 6/2017 | Battle | G06F 1/3243 |
| 2018/0165199 A1 | 6/2018 | Brandt et al. | |
| 2021/0096874 A1* | 4/2021 | Sobel | G06F 9/3838 |

OTHER PUBLICATIONS

International Search Report and written opinion in related International Application No. PCT/US20/51224, dated Jan. 5, 2021 (11 pgs.).

* cited by examiner

*Primary Examiner* — Courtney P Carmichael-Moody
(74) *Attorney, Agent, or Firm* — Finnegan, Henderson, Farabow, Garrett & Dunner, LLP

(57) ABSTRACT

Embodiments of the present disclosure provide an instruction processing apparatus, comprising an instruction decoding circuitry configured to decode a set of instructions; a buffer comprising one or more buffer entries associated with the set of instructions, wherein the one or more buffer entries are configured to store information corresponding to at least one instruction of the set of instructions decoded by the instruction decoding circuitry; and an instruction executing circuitry configured to execute the at least one instruction, wherein a buffer entry storing the information corresponding to the at least one instruction is updated to indicate that the at least one instruction has been executed to enable retiring the set of instructions after the set of instructions have been executed.

25 Claims, 6 Drawing Sheets

STORING MULTIPLE INSTRUCTIONS IN A SINGLE REORDERING BUFFER ENTRY

CROSS REFERENCE TO RELATED APPLICATION

This disclosure claims the benefits of priority to Chinese application number 201910900700.9, filed Sep. 23, 2019, which is incorporated herein by reference in its entirety.

TECHNICAL FIELD

The present disclosure relates to the field of processors, and in particular, to orderings of instructions in processor cores and processors.

BACKGROUND

Modern processors or processor cores process instructions in a pipelined manner. A typical pipeline usually includes various pipeline stages such as instruction fetching, instruction decoding, instruction transmission, instruction execution, and instruction retirement. In a high-performance multi-transmitting processor, a plurality of instructions can be sequentially decoded in a same clock cycle at the instruction decoding stage, and then the plurality of instructions can be simultaneously executed out of order at the instruction execution stage.

SUMMARY

Embodiments of the present disclosure provide an instruction processing apparatus, comprising: an instruction decoding circuitry configured to decode a set of instructions; a buffer comprising one or more buffer entries associated with the set of instructions, wherein the one or more buffer entries are configured to store information corresponding to at least one instruction of the set of instructions decoded by the instruction decoding circuitry; and an instruction executing circuitry configured to execute the at least one instruction, wherein a buffer entry storing the information corresponding to the at least one instruction is updated to indicate that the at least one instruction has been executed to enable retiring the at least one instruction.

Embodiments of the present disclosure further provide an instruction processing method, comprising decoding a set of instructions; storing, in a buffer entry of a buffer, information corresponding to at least one instruction of the set of instructions that are decoded, wherein the buffer comprises one or more buffer entries associated with the set of instructions; executing the at least one instruction; and updating the buffer entry storing the information corresponding to the at least one instruction to indicate that the at least one instruction has been executed to enable retiring the at least one instruction.

Embodiments of the present disclosure further provide a system on chip, comprising an instruction processing apparatus, comprising: an instruction decoding circuitry configured to decode a set of instructions; a buffer comprising one or more buffer entries associated with the set of instructions, wherein the one or more buffer entries are configured to store information corresponding to at least one instruction of the set of instructions decoded by the instruction decoding circuitry; and an instruction executing circuitry configured to execute the at least one instruction, wherein a buffer entry storing the information corresponding to the at least one instruction is updated to indicate that the at least one instruction has been executed to enable retiring the at least one instruction.

Embodiments of the present disclosure further provide an intelligent device comprising a system on chip that comprises an instruction processing apparatus, comprising: an instruction decoding circuitry configured to decode a set of instructions; a buffer comprising one or more buffer entries associated with the set of instructions, wherein the one or more buffer entries are configured to store information corresponding to at least one instruction of the set of instructions decoded by the instruction decoding circuitry; and an instruction executing circuitry configured to execute the at least one instruction, wherein a buffer entry storing the information corresponding to the at least one instruction is updated to indicate that the at least one instruction has been executed to enable retiring the at least one instruction.

DETAILED DESCRIPTION

To make the objectives, technical solutions and advantages of the embodiments of the present disclosure clearer, the technical solutions in the embodiments of the present disclosure are described below with reference to the accompanying drawings in the embodiments of the present disclosure. The described embodiments are merely some rather than all of the embodiments of the present disclosure. Based on the embodiments in the present disclosure, all other embodiments obtained by those with ordinary skill in the art without creative efforts should fall within the protective scope of the present disclosure.

In order to enable results of instructions executed out of order to be retired in order, a re-ordering buffer ("ROB") is introduced in the pipeline. The ROB plays a role of re-ordering the results of the instructions executed out of order. After the instructions are executed out of order, execution results will be submitted out of order to the ROB. The ROB can retire the execution results submitted out of order in the order of entries.

The ROB can accommodate instructions executed out of order. When the ROB cannot accommodate more instructions, ROB entries cannot be created for decoded instructions, and a processing pipeline may be forced to stop or halt, resulting in a performance loss. As a result, the more instructions the ROB can accommodate, the greater the number of parallel retirement (pop-up) instructions is, and the better the performance of the processor is. To accommodate more instructions, however, the ROB needs to occupy more resources.

There is a need to improve the capacity and retirement speed of the re-ordering buffer without taking up too much resources in a processor or processor core. Therefore, a new re-ordering buffer solution is needed, which can solve or alleviate the above problems, increase the capacity and retirement speed of a re-ordering buffer, and improve the performance of a processor or a processor core.

Figure 1:
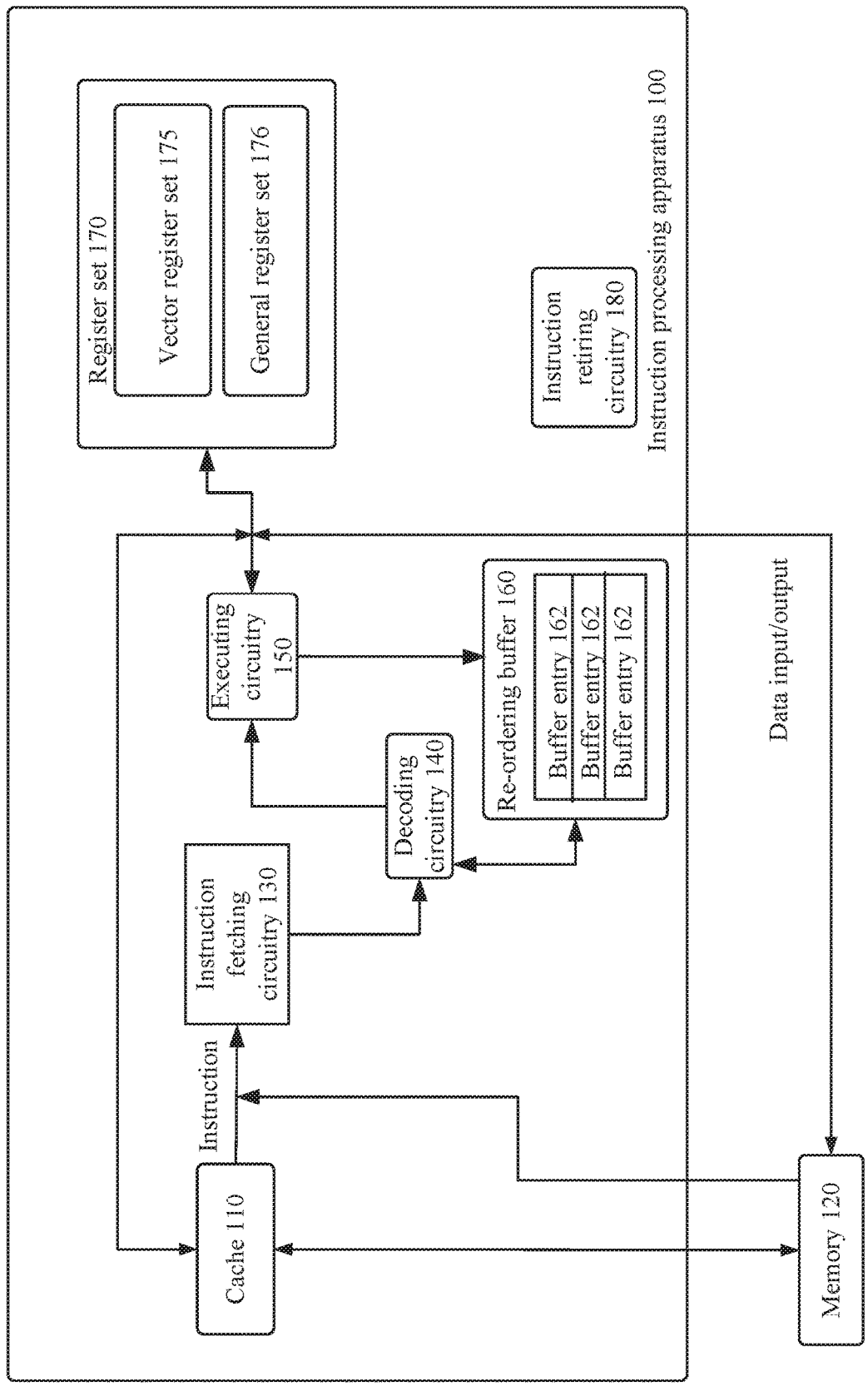
FIG. 1 is a schematic of an example instruction processing apparatus 100, according to some embodiments of the present disclosure.

FIG. 1 is a schematic of an example instruction processing apparatus 100, according to some embodiments of the present disclosure. In some embodiments, instruction processing apparatus 100 may be a processor, a processor core of a multi-core processor, or a processing element in an electronic system.

As shown in FIG. 1, instruction processing apparatus 100 can include instruction fetching circuitry 130. Instruction fetching circuitry 130 may obtain instructions to be processed from cache 110, memory 120, or another source, and send them to decoding circuitry 140. In some embodiments, the instructions fetched by instruction fetching circuitry 130 can include high-level machine instructions or macro instructions. Processing apparatus 100 can implement certain functions by executing these instructions.

In some embodiments, decoding circuitry 140 receives the instructions transmitted from instruction fetching circuitry 130 and decodes these instructions to generate low-level micro-operations, microcode entry points, micro-instructions, or other low-level instructions or control signals, which correspond to the received instructions or are exported from the received instructions. In some embodiments, the low-level instructions or control signals may implement operations of high-level instructions through low-level (e.g., circuit-level or hardware-level) operations. In some embodiments, decoding circuitry 140 may be implemented using various different mechanisms. Examples of suitable mechanisms can include microcode, a lookup table, a hardware implementation, or a programmable logic array ("PLA").

In some embodiments, decoding circuitry 140 can send decoded instructions to executing circuitry 150. In some embodiments, decoding circuitry 140 may decode a plurality of instructions in one clock cycle, and may transmit the plurality of instructions out of order to executing circuitry 150, thus improving the instruction processing efficiency. At the same time, after decoding the instructions, decoding circuitry 140 can store information related to the decoded instructions, such as instruction program counters ("PCs"), into re-ordering buffer 160 communicatively coupled to decoding circuitry 140. Re-ordering buffer 160 has one or more buffer entries 162 to save information related to the instructions that have been decoded.

In some embodiments, executing circuitry 150 can include a circuit operable to execute instructions. When executing these instructions, executing circuitry 150 can receive data input from register set 170, cache 110, or memory 120, generate data, and output the data to register set 170, cache 110, or memory 120.

In some embodiments, register set 170 can include architectural registers, which are also referred to as registers. Unless otherwise specified, phrases such as the architectural register, the register set, and the register can be used to denote registers that are visible to software or programmers (e.g., visible to software) or designated by macro instructions to identify operands. These registers are different from other non-architectural registers in a given micro-architecture (e.g., a temporary register, a re-ordering buffer, a retirement register, etc.). In some embodiments, register set 170 may include a set of vector registers 175, wherein each vector register may be 512 bits, 256 bits, or 128 bits wide, or different vector widths may be used. In some embodiments, register set 170 may further include a set of general registers 176. Each of the general registers may be used when the executing circuitry executes instructions that store jump conditions.

It is appreciated that there may be more than one executing circuitry in instruction processing apparatus 100. For example, apparatus 100 may include a plurality of executing circuitries of different types, such as an arithmetic circuitry, an arithmetic logic circuitry ("ALU"), an integer circuitry, or a floating point circuitry.

In some embodiments, according to the instructions transmitted from decoding circuitry 140 out of order (e.g., arithmetic operation instructions, floating-point number calculation instructions, conditional jump or unconditional jump instructions, etc.), these instructions can be respectively executed by different executing circuitries 150. After completing the execution of an instruction, executing circuitry 150 can update instruction information saved in corresponding buffer entry 162 of re-ordering buffer 160 to indicate that the execution of the instruction is completed.

In some embodiments, re-ordering buffer 160 can create buffer entries 162 for the instructions decoded by decoding circuitry 140 in order. These instructions are executed out of order in executing circuitry 150, and buffer entries 162 may be updated (e.g., also out of order) after the execution is completed. Then, re-ordering buffer 160 can perform processing according to an order in which buffer entries 162 are created. In some embodiments, when all instructions associated with buffer entry 162 first created have been executed, the instructions associated with buffer entry 162 can be moved to instruction retiring circuitry 180.

In some embodiments, re-ordering buffer 160 may manage buffer entries 162 in a variety of manners. For example, re-ordering buffer 160 may store buffer entries 162 column by column in a buffer area, or may store buffer entries 162 row by row according to actual requirements. Regardless of whether buffer entries 162 are stored row by row or column by column, buffer entries 162 can be rapidly defined and further processed in re-ordering buffer 160.

In some embodiments, instruction retiring circuitry 180 can perform retirement processing on the executed instructions. For example, instruction retiring circuitry can modify content of each register or memory according to execution results of the instructions, perform interruption or exception processing, and complete the instruction processing.

It is appreciated that the instruction processing apparatus or processor may have a plurality of cores, logical processors, or execution engines.

Figure 2:
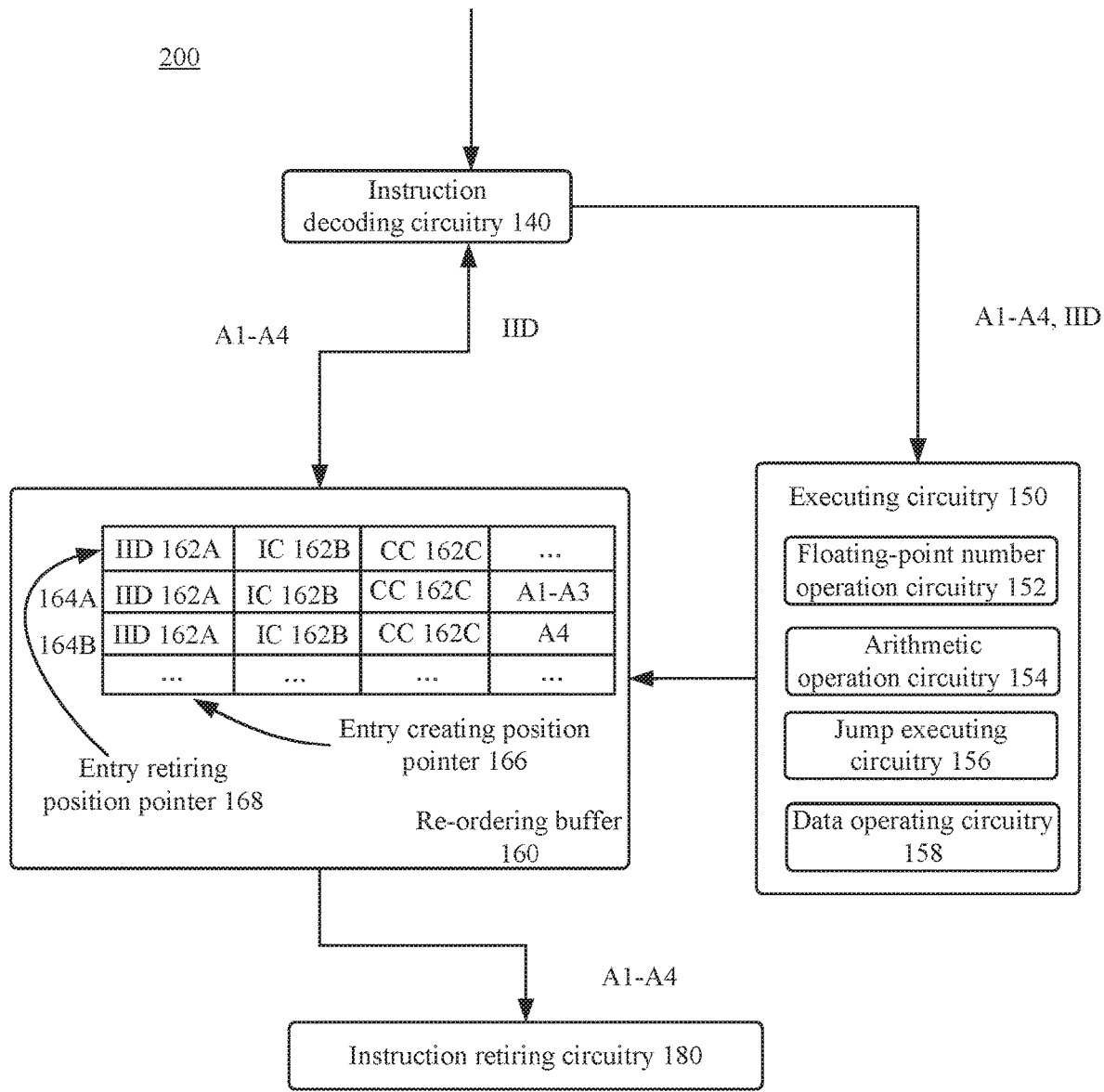
FIG. 2 is a schematic of an example instruction processing apparatus, according to some embodiments of the present disclosure.

FIG. 2 is a schematic of an example instruction processing apparatus, according to some embodiments of the present disclosure. As shown in FIG. 2, instruction processing apparatus 200 can include parts of instruction processing apparatus 100 shown in FIG. 1. In addition, various components in various units or circuitries can be functionally divided, and they can be rearranged and combined for physical implementation without departing from the protection scope of the present disclosure.

As shown in FIG. 2, instruction decoding circuitry 140 can decode the instruction read an instruction fetching circuitry (e.g., instruction fetching circuitry 130 shown in FIG. 1) to obtain the decoded instruction. In some embodiments, each decoded instruction can include information that can identify the instruction, such as an instruction PC value. In some embodiments, instruction decoding circuitry 140 can decode a plurality of instructions in one clock cycle.

For example, as shown in FIG. 2, instruction decoding circuitry 140 can decode a total of 4 instructions A1 to A4 in one clock cycle. Each instruction has a corresponding program counter PC value (e.g., P1 to P4). In some embodiments, for a decoded instruction, corresponding information of the decoded instruction can be stored in buffer entry 162 of re-ordering buffer 160, so as to indicate a processing state of the instruction in a subsequent pipeline of the processor, such as an instruction execution state and an instruction PC value. It is appreciated that one buffer entry 162 can store information for a plurality of instructions. For example, Information related to a plurality of decoded instructions may be stored in buffer entry 162. For example, a plurality of decoded instructions may be stored into the same buffer entry 162.

In some embodiments, each buffer entry 162 can include entry identifier ("IID") 162A, instruction counter ("IC") 162B, or incomplete instruction counter ("CC") 162C. In some embodiments, entry identifier IID 162A can be configured to identify the entry. Instruction counter IC 162B can be configured to indicate the number of instructions currently stored in buffer entry 162. Incomplete instruction counter CC 162C can be configured to indicate the number of instructions that have not been executed by executing circuitry 150 in the instructions stored in buffer entry 162.

In some embodiments, for an instruction stored in each buffer entry 162, information related to execution of the instruction may also be stored in the buffer entry.

In some embodiments, when instruction decoding circuitry 140 stores related information of one decoded instruction into one buffer entry 162, values of the instruction counter IC and the incomplete instruction counter CC can be updated accordingly (e.g., the values are increased by 1, respectively), and other information related to the decoded instruction can be added to buffer entry 162 at the same time. In addition, the entry identifier IID of buffer entry 162 may be returned to instruction decoding circuitry 140, so that instruction decoding circuitry 140 transmits the entry identifier IID along with the decoded instruction to executing circuitry 150.

In some embodiments, for each decoded instruction, information related to the decoded instruction can be stored in buffer entry 162 of re-ordering buffer 160 in a variety of manners. In some embodiments, the information related to the decoded instruction can stored in a buffer entry that has an available buffer space. For example, re-ordering buffer 160 may be searched for buffer entry 162 that stores the least amount of decoded instruction information or less amount of decoded instruction information, and then the information of the decoded instruction is stored in the found buffer entry 162.

In some embodiments, for a plurality of instructions decoded by decoding circuitry 140 in one clock cycle, new buffer entry 162 may be created for a plurality of instructions of the same or similar types, and corresponding buffer entries 162 may also be created for other instructions. For example, for illustrative purposes, two of the buffer entries shown on FIG. 2 can be referred to as buffer entry 164A and buffer entry 164B, and it is appreciated that buffer entry 164A and buffer entry 164B can be a part of the plurality of buffer entries 162. For four instructions A1 to A4, three instructions A1-A3 can be instructions of the same or similar types, and thus buffer entry 164A in which information associated with instructions A1-A3 is stored can be created in re-ordering buffer 160. In addition, buffer entry 164B in which information associated with instruction A4 is stored can be created in re-ordering buffer 160.

In some embodiments, the value of the instruction counter IC of buffer entry 164A is set to the number of instructions, (e.g., 3), in which case the decoded instructions have not been executed by executing circuitry 150. Therefore, the value of the incomplete instruction counter CC is also set to 3. Correspondingly, the value of the instruction counter IC of buffer entry 164B is set to 1, and the value of the incomplete instruction counter CC is also set to 1.

In some embodiments, buffer entry 162 can no longer be updated after the buffer entry is created, so that instruction information associated with the buffer entry is not added. As a result, buffer entries created in each clock cycle may not be updated in a next clock cycle to add information of additional instructions decoded in a next cycle. Although this specific solution may not fully store information of enough instructions in each cache entry, operations on the cache entries can be simpler, resulting in a faster processing speed.

In some embodiments, re-ordering buffer 160 includes entry creating position pointer 166 and entry retiring position pointer 168. Entry creating position pointer 166 can indicate a position of next buffer entry 162 to be created, and entry retiring position pointer 168 can indicate a position of next buffer entry 162 to be retired. In some embodiments, re-ordering buffer 160 is limited to fixed resources. For example, re-ordering buffer 160 may have a buffer space in which only 64 buffer entries 162 can be created. If one buffer entry is to be created, a predetermined space is allocated to the buffer entry in the buffer space. Correspondingly, when one buffer entry is to be retired because all instructions have been executed, a buffer space allocated to the buffer entry in re-ordering buffer 160 needs to be released. In some embodiments, when re-ordering buffer 160 re-orders the instructions executed out of order to facilitate sequential exiting, buffer entries 162 may be successively exited according to an order in which buffer entries 162 are created (e.g., the first created entry is first exited). Therefore, a data structure of a first-in first-out ("FIFO") queue may be used for buffer entries 162, and the position of the queue in a predetermined space can be managed using entry creating position pointer 166 and entry retiring position pointer 168.

In some embodiments, after decoding the instructions, instruction decoding circuitry 140 transmits the decoded instructions to executing circuitry 150 to execute the instructions. In order to improve the processing efficiency, instruction decoding circuitry 140 may transmit a plurality of instructions to executing circuitry 150 in one clock cycle, and an out-of-order transmission manner may be adopted. For example, the instructions may be transmitted to different executing circuitries 150 (e.g., floating point number operation circuitry 152, arithmetic operation circuitry 154, jump executing circuitry 156, and data operating circuitry 158) for execution according to types of the instructions (e.g., a floating point calculation instruction, an arithmetic calculation instruction, a conditional jump instruction, and a data operating instruction).

For example, decoded instructions A1-A3 are arithmetic operation instructions, and thus they can be respectively transmitted to arithmetic operation circuitry 154A and arithmetic operation circuitry 154B for processing. A1 and A2 can be transmitted to arithmetic operation circuitry 154A for processing, and A3 can be transmitted to arithmetic operation circuitry 154B for processing. Instruction A4 is a data reading instruction, and thus is transmitted to data operating circuitry 158 for processing.

In some embodiments, after completing execution of a corresponding instruction, each executing circuitry 150 can update buffer entry 162 storing information related to the instruction in re-ordering buffer 160 so as to indicate that the execution of the instruction has been completed. In some embodiments, when decoding circuitry 140 transmits the entry identifier IIDs of buffer entries 162 together to executing circuitry 150, executing circuitry 150 may find, according to the entry identifier IIDs, a buffer entry 162 storing information related to an executed instruction, and update the buffer entry. For example, the value of the incomplete instruction counter CC of buffer entry 162 may be subtracted by one to indicate that one of instructions has been executed. In addition, information related to the instructions stored in buffer entry 162 may also be updated to indicate that the execution of the instructions is completed.

Using instructions A1-A3 as an example, when completing the execution of instructions A1 and A2, arithmetic operation circuitry 154A can update buffer entry 164A according to the entry identifier IID sent along with instructions A1 and A2. For example, the update can include successively subtracting the CC values of buffer entry 164A by one to make them become a value of one. When completing the execution of instruction A3, arithmetic operation circuitry 154B can update buffer entry 164A according to the entry identifier IID sent along with instruction A3. For example, the update can include subtracting the CC value of buffer entry 164A by one, thus decreasing the CC value to zero, so as to indicate that all instructions related to buffer entry 164A have been executed and can be exited.

Using instruction A4 as an example, when completing the execution of instruction A4, data operating circuitry 158 can update buffer entry 164B according to the entry identifier IID. For example, the update can include decreasing the CC value to zero, so as to indicate that all instructions related to buffer entry 164B have been executed and can be exited.

In some embodiments, re-ordering buffer 160 can make the instructions that have been executed exit successively. Specifically, re-ordering buffer 160 can determine an instruction to exit by taking buffer entry 162 as an object. When all instructions associated with buffer entry 162 first created in buffer 160 have been executed, all the instructions can exit.

In some embodiments, re-ordering buffer 160 can determine, according to entry retiring position pointer 168, next buffer entry 162 to be determined for retirement. For buffer entry 162 in the position indicated by entry retiring position pointer 168, if all instructions associated with buffer entry 162 have been executed (e.g., when the CC value of buffer entry 162 is 0), all instructions associated with buffer entry 162 can be popped up to instruction retiring circuitry 180, so that instruction retiring circuitry 180 can retire the instructions. Then, re-ordering buffer 160 may update the value of pointer 168, so as to point to next buffer entry 162 to be determined for retirement.

For example, when the CC values of buffer entries 164A and 164B are both 0, it can be an indication that all the instructions therein have been executed. Buffer entry 164A is created prior to buffer entry 164B, and thus entry retiring position pointer 168 may first point to buffer entry 164A and pop up the instructions (e.g., A1, A2, and A3) associated with buffer entry 164A to instruction retiring circuitry 180 to complete retirement processing, and then pointer 168 points to buffer entry 164B, so as to pop up instruction A4 associated with buffer entry 164B to instruction retiring circuitry 180 to complete the retirement processing.

In some embodiments, a plurality of buffer entries 162 may be determined in one clock cycle, and all instructions associated with the plurality of buffer entries 162 can be retired.

In some embodiments, information of a plurality of instructions may be stored for each buffer entry in a re-ordering buffer. As a result, when the plurality of instructions have been executed, all instructions associated with a certain buffer entry can be retired at the same time. Therefore, the number of instructions that are retired at the same time in each clock cycle can be significantly increased, thereby improving the instruction processing performance.

In some embodiments, a corresponding buffer entry can be created in the re-ordering buffer for a plurality of instructions decoded in the same clock cycle, and after the instructions are executed out of order by an executing circuitry, the instructions can be retired all at once, thus also increasing the number of instructions that can be decoded and executed at the same time in each clock cycle and improving the instruction processing performance.

For example, an ROB can include 64 entries and can retire 3 entries in parallel. If one buffer entry 162 of each ROB may correspond to at most 3 instructions (e.g., store information of 3 instructions), the ROB may accommodate 192 instructions and retire 9 instructions in parallel. The number of instructions accommodated and retired in parallel by a ROB under the same resources can be significantly increased, thus greatly improving the performance of the processor.

In some embodiments, in order to manage the data structure (e.g., FIFO) of ROB 160, a state flag bit may be allocated to each buffer entry 162 to indicate whether buffer entry 162 is valid. As a result, buffer entries 162 can be well allocated. In some embodiments, when buffer entry 162 is created, its state flag bit is set to indicate that the buffer entry is valid (e.g., set to a value of 1). When buffer entry 162 is deleted, its state flag bit is set to indicate that the buffer entry is invalid (e.g., set to a value of 0). The efficiency of allocation and release of buffer entries can be improved.

In some embodiments, offset value information may also be added for each buffer entry 162. The offset value information can indicate a sum of offset values of instructions associated with a buffer entry. Because of the association between instructions, the total number of instructions stored in each buffer entry can be determined based on the sum of offset values of the instructions. In some embodiments, the information can be used to replace an instruction counter IC.

In some embodiments, buffer entries are created in an ROB only for some instructions, while corresponding buffer entries may not be created for arithmetic operation instructions, floating point instructions, or vector instructions that may not produce exception results. In some embodiments, these instructions can directly exit, thus further increasing the capacity and the retirement speed of the ROB.

Figure 3:
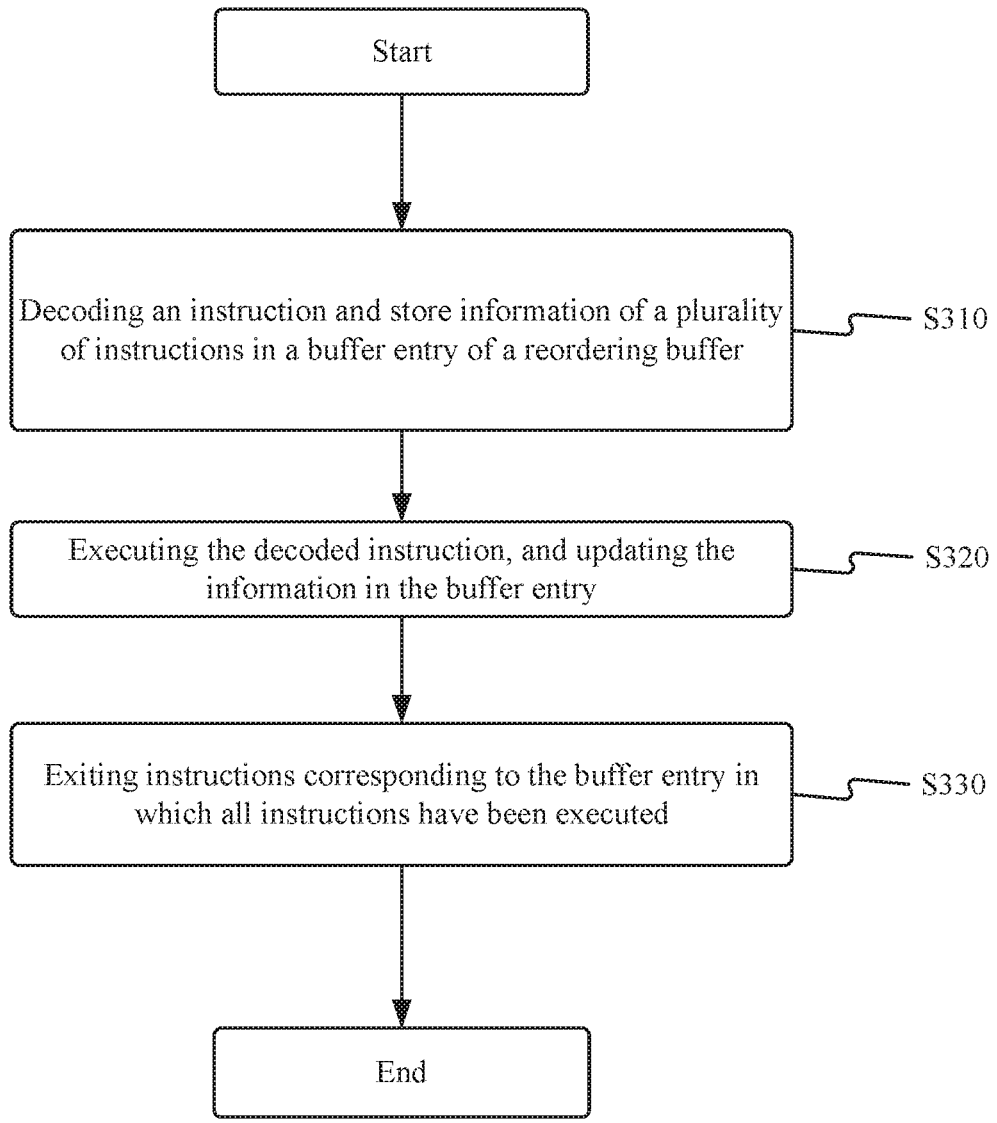
FIG. 3 is a flowchart of an example instruction processing method, according to some embodiment of the present disclosure.

FIG. 3 is a flowchart of an example instruction processing method, according to some embodiment of the present disclosure. As shown in FIG. 3, it is appreciated that instruction processing method 300 by instruction processing apparatus 100 of FIG. 1 or instruction processing apparatus 200 of FIG. 2. In step S310, a read instruction is decoded to obtain a decoded instruction. The decoded instruction can include information that can identify the instruction, such as an instruction PC value. In some embodiments, a plurality of instructions may be decoded in one clock cycle. In some embodiments, for a decoded instruction, corresponding information of the decoded instruction can be stored in buffer entry 162 of re-ordering buffer 160, so as to indicate a processing state of the instruction in a subsequent pipeline of a processor. For example, the processing state of the instruction can include an instruction execution state and an instruction PC value. Information related to a plurality of decoded instructions may be stored in buffer entry 162.

In some embodiments, each buffer entry 162 can include entry identifier IID 162A, IC 162B, and incomplete instruction counter CC 162C. Entry identifier IID 162A can be configured to identify the entry. Instruction counter IC 162B can be configured to indicate the number of instructions currently stored in buffer entry 162. Incomplete instruction counter CC 162C can be configured to indicate the number of instructions that have not been executed by executing circuitry 150 in the instructions stored in buffer entry 162.

In some embodiments, for an instruction stored in each buffer entry 162, information related to execution of the instruction may also be stored in the buffer entry.

In some embodiments, when information of one decoded instruction is stored into one buffer entry 162, values of the instruction counter IC and the incomplete instruction counter CC can be updated accordingly. For example, the values of the instruction counter IC and the incomplete instruction counter CC can be increased by 1, respectively. In some embodiments, other information related to the decoded instruction can be added to buffer entry 162 at the same time. In addition, the entry identifier IID of buffer entry 162 may be returned so as to transmit the entry identifier IID along with the decoded instruction to an executing circuitry for execution.

In some embodiments, for each decoded instruction, information related to the decoded instruction can be stored in buffer entry 162 of re-ordering buffer 160 in a variety of manners. For example, re-ordering buffer 160 may be searched for a buffer entry 162 that stores least amount of decoded instruction information or less amount of decoded instruction information, and then the information of the decoded instruction can be stored in the found buffer entry 162.

In some embodiments, for a plurality of instructions decoded in one clock cycle, new buffer entry 162 may be created for a plurality of instructions of the same or similar types, and corresponding buffer entries 162 may also be created for other instructions.

In some embodiments, buffer entry 162 can no longer be updated after the buffer entry is created, so that instruction information associated with the buffer entry may not be added. As a result, buffer entries created in each clock cycle may not be updated in a next clock cycle to add instructions decoded in a next cycle. Although this solution may not fully store enough instructions in each cache entry, the operation on the cache entry is relatively simple, and the processing speed can be improved.

In some embodiments, re-ordering buffer 160 can include entry creating position pointer 166 and entry retiring position pointer 168. Entry creating position pointer 166 can indicate a position of next buffer entry 162 to be created. Entry retiring position pointer 168 can indicate a position of next buffer entry 162 to be retired. In some embodiments, re-ordering buffer 160 is limited to fixed resources. For example, re-ordering buffer 160 may only have a buffer space in which 64 buffer entries 162 can be created. If one buffer entry is to be created, a predetermined space is allocated to the buffer entry in the buffer space. Correspondingly, when one buffer entry is to be retired because all instructions corresponding to the buffer entry have been executed, a buffer space allocated to the buffer entry in re-ordering buffer 160 needs to be released. In some embodiments, when re-ordering buffer 160 re-orders the instructions executed out of order to facilitate sequential exiting, buffer entries 162 may be successively exited according to an order in which buffer entries 162 are created. (e.g., the first created entry is first exited). Therefore, a data structure of a FIFO queue may be used for buffer entries 162, and the position of the queue in a predetermined space can be managed using entry creating position pointer 166 and entry retiring position pointer 168.

Referring back to FIG. 3, in step S320, the instructions decoded in step S310 can be executed. In some embodiments, the instructions decoded in step S310 can be executed in executing circuitry 150 shown in FIG. 1 or FIG. 2. In some embodiments, in order to improve the processing efficiency, a plurality of instructions may be transmitted to executing circuitry 150 for processing in one clock cycle, and an out-of-order transmission manner may be adopted. For example, the instructions may be transmitted to different executing circuitries 150 (e.g., floating point number operation circuitry 152, arithmetic operation circuitry 154, jump executing circuitry 156, or data operating circuitry 158) for execution according to types of the instructions (e.g., a floating point calculation instruction, an arithmetic calculation instruction, a conditional jump instruction, or a data operating instruction).

In some embodiments, after completing execution of a corresponding instruction, each executing circuitry 150 can update buffer entry 162 storing information related to the instruction in re-ordering buffer 160 so as to indicate that the execution of the instruction has been completed. In some embodiments, when the entry identifier IIDs of buffer entries 162 are transmitted together to executing circuitry 150, executing circuitry 150 may find, according to the entry identifier IIDs, a buffer entry 162 storing information related to an executed instruction, and update the buffer entry. For example, the value of the incomplete instruction counter CC of buffer entry 162 may be subtracted by one to indicate that one of instructions has been executed. In addition, information related to the instructions stored in buffer entry 162 may also be updated to indicate that the execution of the instructions is completed.

In step S330, the instructions that have been executed can exit successively. In some embodiments, the instructions that have been executed can exit successively from re-ordering buffer 160. In some embodiments, re-ordering buffer 160 can determine an instruction to exit by taking buffer entry 162. For example, when all instructions associated with buffer entry 162 first created in buffer 160 have been executed, all the instructions are exited.

In some embodiments, re-ordering buffer 160 can determine, according to entry retiring position pointer 168, next buffer entry 162 for retirement. For buffer entry 162 in the position indicated by entry retiring position pointer 168, if all instructions associated with buffer entry 162 have been executed (e.g., when the CC value of buffer entry 162 is 0), all instructions associated with buffer entry 162 can be sent to instruction retiring circuitry 180, so that instruction retiring circuitry 180 can retire the instructions. Then, re-ordering buffer 160 may update the value of pointer 168, so as to point to next buffer entry 162 for retirement. In some embodiments, re-ordering buffer 160 may update the value of pointer 168 at a direction of instruction retiring circuitry 180.

In some embodiments, a plurality of buffer entries 162 may be determined in one clock cycle, and all instructions associated with buffer entries 162 are retired.

In some embodiments, related information of a plurality of instructions may be stored for each buffer entry in a re-ordering buffer. As a result, when the plurality of instructions have been executed, all instructions associated with a certain buffer entry can be retired together. The number of instructions that are retired in one clock cycle can be significantly increased, thereby improving the instruction processing performance.

In some embodiments, in order to manage the data structure (e.g., FIFO) of ROB 160, a state flag bit may be allocated to each buffer entry 162 to indicate whether buffer entry 162 is valid. As a result, buffer entries 162 can be well allocated. In some embodiments, when buffer entry 162 is created, its state flag bit is set to indicate that the buffer entry is valid (e.g., set to a value of 1). When buffer entry 162 is deleted, its state flag bit is set to indicate that the buffer entry is invalid (e.g., set to a value of 0). The efficiency of allocation and release of buffer entries can be improved.

In some embodiments, the instruction processing apparatus may be implemented as a processor core, and the instruction processing method may be executed in the processor core. The processor core may be implemented in different processors in different manners. For example, the processor core may be implemented as a general ordered core for general computing, a high-performance general unordered core for general computing, and a dedicated core for graphics or scientific (e.g., throughput) computing. The processor may be implemented as a Central Processing Unit ("CPU") or co-processor, where the CPU may include one or more general ordered cores or one or more general unordered cores, and the co-processor may include one or more dedicated cores. Such a combination of different processors may lead to different computer system architectures. In some embodiments, the co-processor can be located on a chip separate from the CPU. In some embodiments, the co-processor can be located in the same package as the CPU but on a separate die. In some embodiments, the co-processor can be located on the same die as the CPU, and such a co-processor can sometimes be referred to as dedicated logic such as integrated graphics or scientific (e.g., throughput) logic, or referred to as a dedicated core. In some embodiments, the described CPU (sometimes referred to as an application core or application processor), the described co-processor, and additional functions may be included on the same die.

Figure 4:
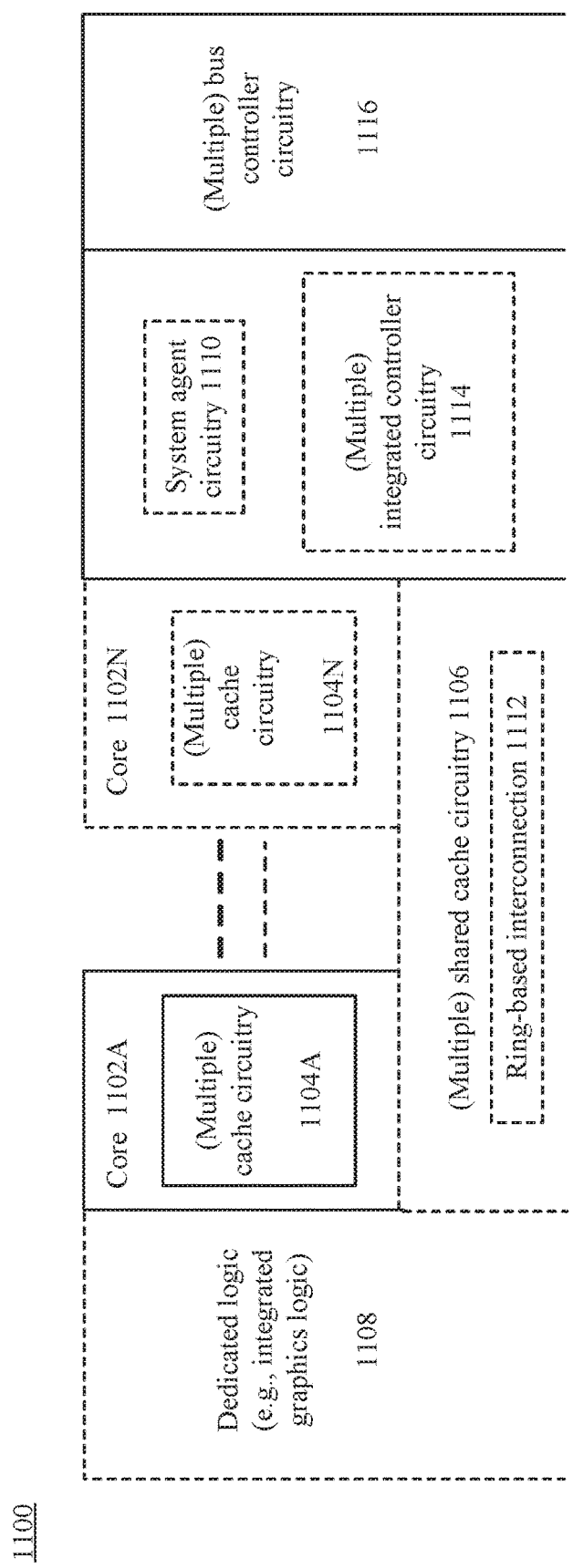
FIG. 4 is a schematic of an example processor, according to some embodiments of the present disclosure.

FIG. 4 is a schematic of an example processor, according to some embodiments of the present disclosure. As shown by the solid line box in FIG. 4, processor 1100 can include single core 1102A, system agent circuitry 1110, and bus controller circuitry 1116. As shown by the dotted box in FIG. 4, processor 1100 may further include a plurality of cores 1102A-N, integrated memory controller circuitry 1114 in system agent circuitry 1110, and dedicated logic 1108.

In some embodiments, processor 1100 may be implemented as a CPU, wherein dedicated logic 1108 can be the integrated graphics or scientific (e.g., throughput) logic which may include one or more cores. Cores 1102A-N can be one or more general cores (e.g., a general ordered core, a general unordered core, and a combination of both). In some embodiments, processor 1100 may be implemented as a co-processor, wherein cores 1102A-N can be a plurality of dedicated cores for graphics or scientific (e.g., throughput) logic. In some embodiments, processor 1100 may be implemented as a co-processor, wherein cores 1102A-N can be a plurality of general ordered cores. Therefore, processor 1100 may be a general processor, a co-processor, or a dedicated processor. For example, processor 1100 can be a network or communication processor, a compression engine, a graphics processor, a general-purpose graphics processing unit ("GPGPU"), a high-throughput many integrated core ("MIC") co-processor (including 30 or more cores), or an embedded processor. In some embodiments, the processor may be implemented on one or more chips. In some embodiments, processor 1100 may be part of one or more substrates, or may be implemented on the one or more substrates by using any of a plurality of processing techniques such as BiCMOS, CMOS, or NMOS.

In some embodiments, a memory hierarchical structure can include one or more levels of cache within each core, one or more shared cache circuitries 1106, or an external memory (not shown) communicatively coupled to integrated memory controller circuitry 1114. In some embodiments, shared cache circuitry 1106 may include one or more intermediate level caches, such as level 2 ("L2"), level 3 ("L3"), level 4 ("L4"), or other levels of cache, last level cache ("LLC"), or combinations thereof. In some embodiments, ring-based interconnection circuitry 1112 can communicatively couple integrated graphics logic 1108, shared cache circuitry 1106, system agent circuitry 1110, or integrated memory controller circuitry 1114. It is appreciated that these units or circuitries may be interconnected using any techniques.

In some embodiments, system agent circuitry 1110 can include components that coordinate and operate cores 1102A-N. System agent circuitry 1110 may include, for example, a power control unit ("PCU") including circuitries and a display circuitry. The PCU may include logic and components that are needed to adjust power states of cores 1102A-N and integrated graphics logic 1108. The display circuitry can be configured to drive one or more externally connected displays.

In some embodiments, cores 1102A-N may have the core architecture described above with reference to FIG. 1 and may be homogeneous or heterogeneous in terms of architectural instruction set. For example, two or more of cores 1102A-N may be able to execute the same instruction set, while other cores may be able to execute only a subset of the instruction set or a different instruction set.

Figure 5:
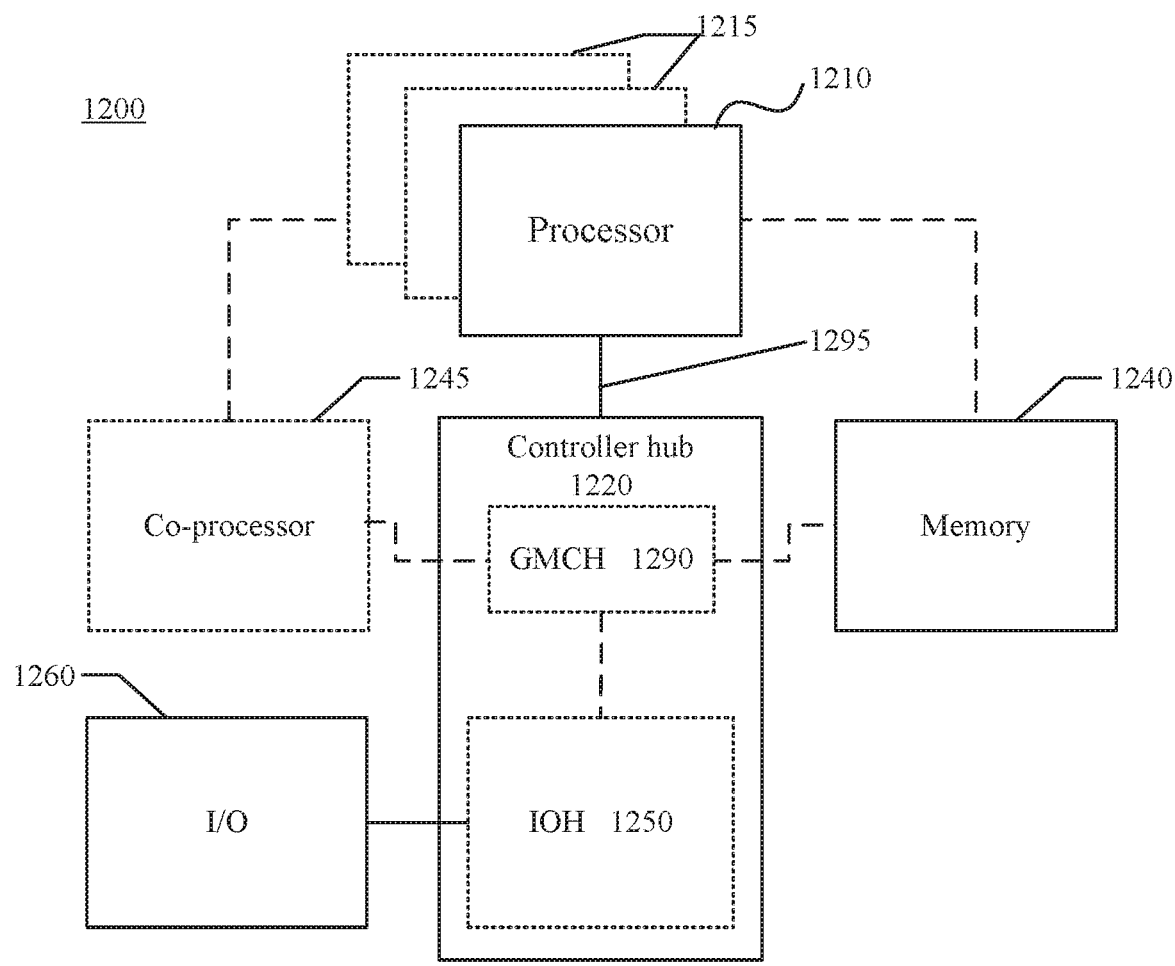
FIG. 5 is a schematic of an example computer system, according to some embodiments of the present disclosure.

FIG. 5 is a schematic of an example computer system, according to some embodiments of the present disclosure. As shown in FIG. 5, computer system 1200 may be applied to a laptop device, a desktop computer, a handheld PC, a personal digital assistant, an engineering workstation, a server, a network device, a network hub, a switch, an embedded processor, a digital signal processor ("DSP"), a graphic device, a video game device, a set-top box, a microcontroller, a cellular phone, a portable media player, a handheld device, and other electronic devices.

As shown in FIG. 5, system 1200 may include one or more processors 1210 and 1215. These processors can be communicatively coupled to controller hub 1220. In some embodiments, controller hub 1220 can include graphics memory controller hub ("GMCH") 1290 and input/output hub ("IOH") 1250. In some embodiments, GMCH 1290 and IOH 1250 may be located on separate chips. GMCH 1290 can include a memory controller and a graphics controller communicatively coupled to memory 1240 and co-processor 1245. IOH 1250 can communicatively couple I/O device 1260 and GMCH 1290. In some embodiments, the memory controller and the graphics controller are integrated in the processor, so that memory 1240 and co-processor 1245 can be directly coupled to processor 1210, and controller hub 1220 includes only IOH 1250.

In some embodiments, an optional property of the additional processor 1215 is shown in dashed lines in FIG. 5. In some embodiments, each of the processors 1210 and 1215 may include one or more processing cores, and may be similar to processor 1100 shown in FIG. 4.

In some embodiments, memory 1240 may be, for example, a dynamic random access memory ("DRAM"), a phase change memory ("PCM"), or a combination of both. In some embodiments, controller hub 1220 communicates with processors 1210 and 1215 via a multi-drop bus such as a front side bus ("FSB"), a point-to-point interface such as quick path interconnect ("QPI"), or a similar connection 1295.

In some embodiments, co-processor 1245 is a dedicated processor, such as a high-throughput MIC processor, a network or communication processor, a compression engine, a graphics processor, a GPGPU, or an embedded processor. In some embodiments, controller hub 1220 may include an integrated graphics accelerator.

In some embodiments, processor 1210 executes instructions that control data processing operations of general types. Embedded in these instructions may be co-processor instructions. Processor 1210 can identify these co-processor instructions as having a type that should be executed by the communicatively coupled co-processor 1245. As a result, processor 1210 can issue these co-processor instructions or control signals representing co-processor instructions to co-processor 1245 on the co-processor bus or an interconnect. Co-processor 1245 can accept and execute the received co-processor instructions.

Figure 6:
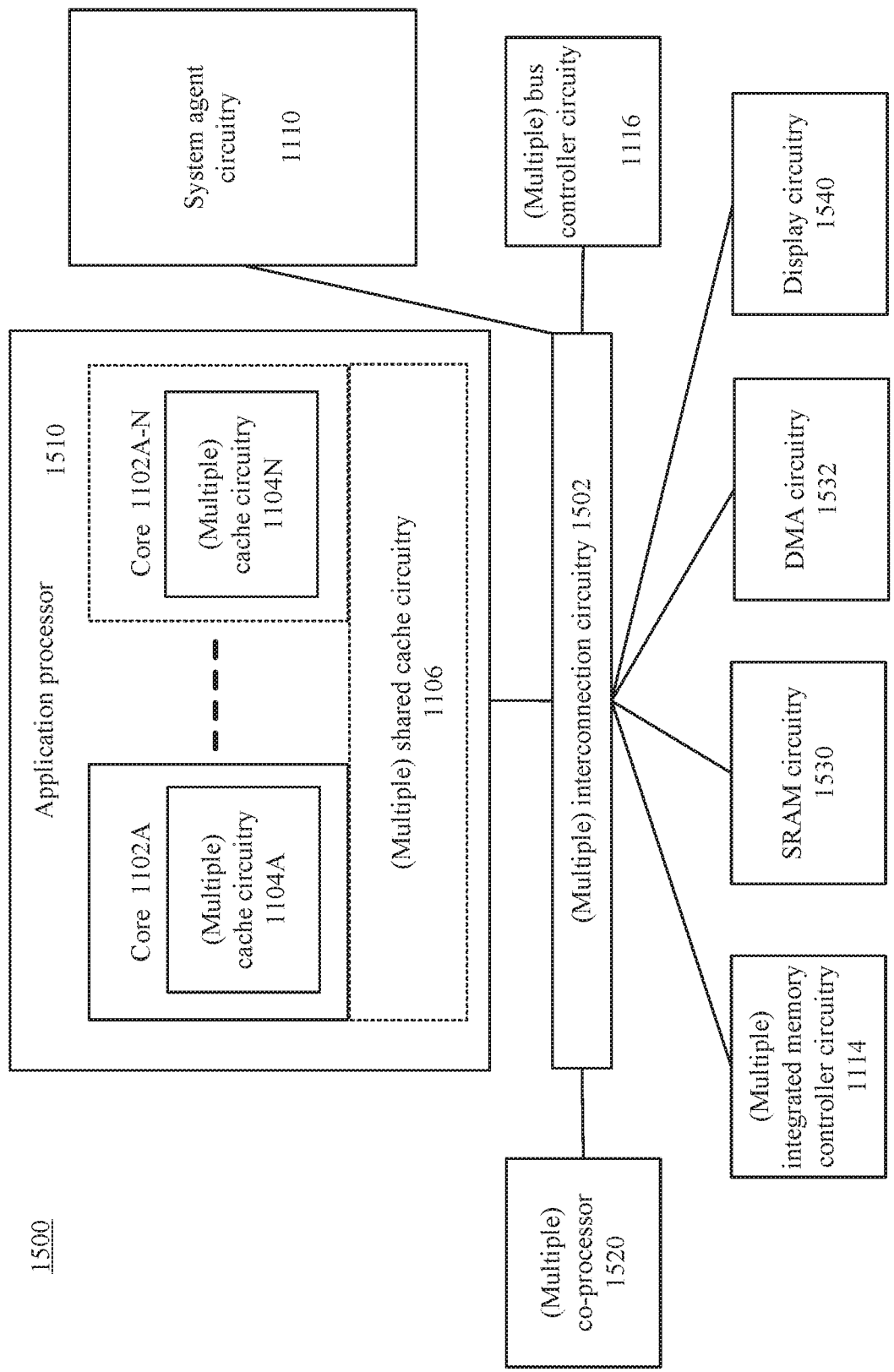
FIG. 6 is a schematic of an example system on chip, according to some embodiments of the present disclosure.

FIG. 6 is a schematic of an example system on chip, according to some embodiments of the present disclosure. As shown in FIG. 6, it is appreciated that system on chip 1500 can include processor 1100 shown in FIG. 4. As shown in FIG. 6, interconnection circuitry 1502 can be communicatively coupled to application processor 1510, system agent circuitry 1110, bus controller circuitry 1116, integrated memory controller circuitry 1114, one or more co-processors 1520, static random access memory ("SRAM") circuitry 1530, direct memory access ("DMA") circuitry 1532, or display circuitry 1540. In some embodiments, display circuitry 1540 can be configured to be communicatively coupled to one or more external displays. In some embodiments, application processor 1510 can include a set of one or more cores 1102A-N and shared cache circuitry 1106. In some embodiments, co-processor 1520 can include integrated graphics logic, an image processor, an audio processor, and a video processor. In some embodiments, co-processor 1520 can include a dedicated processor, such as a network or communication processor, a compression engine, a GPGPU, a high-throughput MIC processor, or an embedded processor.

In some embodiments, system on chip 1500 may be included in an intelligent device in order to realize corresponding functions in the intelligent device. For example, the functions can include executing related control programs, performing data analysis, operation and processing, network communication, controlling peripheral devices in the intelligent device, etc. In some embodiments, intelligent devices can include specialized intelligent devices, such as mobile terminals and personal digital terminals. These devices can include one or more systems on chip (e.g., system on chip 1500 of FIG. 6).

In some embodiments, the intelligent devices can also include dedicated devices constructed to achieve specific functions, such as intelligent speakers and intelligent display devices. These devices include the system on chip (e.g., system on chip 1500 of FIG. 6) to control the speaker and the display device, thereby giving the speaker and the display device additional functions such as communication, perception, and data processing.

In some embodiments, the intelligent devices also include various internet of things ("IoT") and artificial intelligence of things ("AIoT") devices. These devices can include the system on chip (e.g., system on chip 1500 of FIG. 6) for data processing (e.g., performing AI operations, data communication and transmission, etc.), thereby achieving a denser and more intelligent device distribution.

In some embodiments, the intelligent devices can also be used in vehicles. For example, the intelligent devices may be implemented as in-vehicle devices or may be embedded in vehicles to provide data processing capabilities for intelligent driving of the vehicles.

In some embodiments, the intelligent devices may also be used in the home and entertainment fields. For example, the intelligent devices may be implemented as intelligent speakers, intelligent air conditioners, intelligent refrigerators, intelligent display devices, etc. These devices can include the system on chip (e.g., system on chip 1500 of FIG. 6) for data processing and peripheral control, thereby realizing intelligentization of home and entertainment devices.

In some embodiments, the intelligent devices can also be used in industrial fields. For example, the intelligent devices may be implemented as industrial control devices, sensing devices, IoT devices, AIoT devices, and braking devices. These devices can include the system on chip (e.g., system on chip 1500 of FIG. 6) for data processing and peripheral control, thereby realizing intelligentization of industrial equipment.

In various example embodiments described herein are described in the general context of method steps or processes, which may be implemented in one aspect by a computer program product, embodied in a computer-readable medium, including computer-executable instructions, such as program code, executed by computers to program the processors. A computer-readable medium may include removeable and nonremovable storage devices including, but not limited to, Read Only Memory, Random Access Memory, compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

The embodiments may further be described using the following clauses:

1. An instruction processing apparatus, comprising:
   an instruction decoding circuitry configured to decode a set of instructions;
   a buffer comprising one or more buffer entries associated with the set of instructions, wherein the one or more buffer entries are configured to store information corresponding to at least one instruction of the set of instructions decoded by the instruction decoding circuitry; and
   an instruction executing circuitry configured to execute the at least one instruction, wherein a buffer entry storing the information corresponding to the at least one instruction is updated to indicate that the at least one instruction has been executed to enable retiring the at least one instruction.

2. The instruction processing apparatus of clause 1, further comprising:
an instruction retiring circuitry configured to retire the at least one instruction executed by the instruction executing circuitry, wherein in response to all instructions associated with the buffer entry having been executed, the instruction retiring circuitry is further configured to retire the all instructions associated with the buffer entry.

3. The instruction processing apparatus of clause 2, wherein:
the at least one instruction is a plurality of instructions, and
the buffer entry stores information corresponding to the plurality of instructions.

4. The instruction processing apparatus of clause 3, wherein:
the instruction decoding circuitry is further configured to decode the plurality of instructions in one clock cycle; and
the instruction retiring circuitry is further configured to retire the plurality of instructions in one clock cycle.

5. The instruction processing apparatus of any one of clauses 1-4, wherein for the at least one instruction, a buffer entry is created in the buffer to store information corresponding to the at least one instruction.

6. The instruction processing apparatus of any one of clauses 1-5, wherein for the at least one instruction, the buffer is searched for existing buffer entries to find a buffer entry with available buffer space to store information corresponding to the at least one instructions, and in response to a buffer entry being found, the found buffer entry is updated to store the information corresponding to the at least one instruction.

7. The instruction processing apparatus of any one of clauses 2-6, wherein the buffer comprises:
an entry creating position pointer indicating a position of a next buffer entry to be created; and
an entry retiring position pointer indicating a position of a next buffer entry to be retired,
wherein the instruction executing circuitry is further configured to create a buffer entry in a position indicated by the entry creating position pointer, and
the instruction retiring circuitry is further configured to determine whether an instruction associated with a buffer entry in a position indicated by the entry retiring position pointer can be retired.

8. The instruction processing apparatus of any one of clauses 1-7, wherein the buffer entry comprises a corresponding entry identifier, and the instruction decoding circuitry is further configured to acquire an entry identifier of a buffer entry storing information corresponding to the at least one instruction and send the entry identifier to the instruction executing circuitry along with the at least one instruction; and
the instruction executing circuitry is further configured to update the buffer entry corresponding to the entry identifier in response to the execution of the at least one instruction being completed.

9. The instruction processing apparatus of any one of clauses 1-8, wherein the buffer entry comprises:
an incomplete instruction counter indicating a number of instructions associated with the buffer entry that have not been executed.

10. The instruction processing apparatus of clause 9, wherein:
the instruction decoding circuitry is further configured to set the incomplete instruction counter of the buffer entry to the number of the instructions associated with the buffer entry when the buffer entry is created; and
the instruction executing circuitry is further configured to update the incomplete instruction counter of the buffer entry storing information of the number of instructions after the execution of one of the number of instructions is completed, wherein in response to the incomplete instruction counter of the buffer entry being updated to zero, the instruction retiring circuitry is configured to retire all instructions associated with the buffer entry.

11. The instruction processing apparatus of any one of clauses 1-10, wherein:
the instruction decoding circuitry is further configured to send the set of instructions out of order to the instruction executing circuitry, wherein the set of instructions associated with the one or more buffer entries is retired in an order according to creation times of the one or more buffer entries in the buffer.

12. The instruction processing apparatus of any one of clauses 1-11, wherein the buffer entry comprises:
a state flag indicating whether the buffer entry is valid;
an instruction counter indicating a number of instructions associated with the buffer entry; and
offset value information indicating a sum of program counter offset values of one or more instructions associated with the buffer entry.

13. An instruction processing method, comprising:
decoding a set of instructions;
storing, in a buffer entry of a buffer, information corresponding to at least one instruction of the set of instructions that are decoded, wherein the buffer comprises one or more buffer entries associated with the set of instructions;
executing the at least one instruction; and
updating the buffer entry storing the information corresponding to the at least one instruction to indicate that the at least one instruction has been executed to enable retiring the at least one instruction.

14. The instruction processing method of clause 13, further comprising:
retiring the at least one instruction executed by the instruction executing circuitry in response to all instructions associated with the buffer entry having been executed.

15. The instruction processing method of clause 14, wherein:
the at least one instruction is a plurality of instructions, and
the buffer entry stores information corresponding to the plurality of instructions.

16. The instruction processing method of clause 15, wherein:
decoding a set of instructions comprises decoding the plurality of instructions in one clock cycle; and
retiring the all instructions comprises retiring the plurality of instructions in one clock cycle.

17. The instruction processing method of any one of clauses 13-16, wherein decoding a set of instruction further comprises:
for the at least one instruction, creating a buffer entry in the buffer to store information associated with the at least one instruction.

18. The instruction processing method of any one of clauses 13-17, wherein decoding a set of instructions further comprises:
for the at least one instruction, searching the buffer for existing buffer entries to find a buffer entry with available buffer space to store information corresponding to the at least one instruction, and in response to a buffer entry being found, the found buffer entry is updated to store information corresponding to the at least one instruction.

19. The instruction processing method of any one of clauses 14-18, wherein the buffer comprises:
an entry creating position pointer indicating a position of a next buffer entry to be created; and
an entry retiring position pointer indicating a position of a next buffer entry to be retired, wherein:
  decoding a set of instructions comprises creating a buffer entry in a position indicated by the entry creating position pointer, and
  retiring the at least one instruction comprises determining whether an instruction associated with a buffer entry in a position indicated by the entry retiring position pointer can be retired.

20. The instruction processing method of any one of clauses 13-19, wherein:
the buffer entry comprises a corresponding entry identifier;
decoding a set of instructions comprises acquiring an entry identifier of a buffer entry storing information corresponding to the at least one instruction; and
executing the at least one instruction comprises updating the buffer entry corresponding to the entry identifier in response to the execution of the at least one instruction being completed.

21. The instruction processing method of any one of clauses 13-20, wherein the buffer entry comprises:
an incomplete instruction counter indicating a number of instructions associated with the buffer entry that have not been executed.

22. The instruction processing method of clause 21, wherein:
decoding a set of instructions comprises setting the incomplete instruction counter of the buffer entry to the number of the instructions associated with the buffer entry when the buffer entry is created; and
executing the at least one instruction comprises updating the incomplete instruction counter of the buffer entry storing information corresponding to the number of instructions after the execution one of the number of instructions is completed, wherein in response to the incomplete instruction counter of the buffer entry being updated to zero, all instructions associated with the buffer entry is retired.

23. The instruction processing method of any one of clauses 13-22, wherein:
executing the at least one instruction comprises receiving the set of instructions out of order, wherein the set of instructions associated with the one or more buffer entries is retired in an order according to creation times of the one or more buffer entries in the re-ordering buffer.

24. The instruction processing method of any one of clauses 13-23, wherein the buffer entry comprises:
a state flag indicating whether the buffer entry is valid;
an instruction counter indicating a number of instructions associated with the buffer entry; and
offset value information indicating a sum of program counter offset values of one or more instructions associated with the buffer entry.

25. A system on chip comprising:
an instruction processing apparatus, comprising:
  an instruction decoding circuitry configured to decode a set of instructions;
  a buffer comprising one or more buffer entries associated with the set of instructions, wherein the one or more buffer entries are configured to store information corresponding to at least one instruction of the set of instructions decoded by the instruction decoding circuitry; and
  an instruction executing circuitry configured to execute the at least one instruction, wherein a buffer entry storing the information corresponding to the at least one instruction is updated to indicate that the at least one instruction has been executed to enable retiring the at least one instruction.

26. An intelligent device comprising:
a system on chip, comprising:
  an instruction processing apparatus, comprising:
    an instruction decoding circuitry configured to decode a set of instructions;
    a buffer comprising one or more buffer entries associated with the set of instructions, wherein the one or more buffer entries are configured to store information corresponding to at least one instruction of the set of instructions decoded by the instruction decoding circuitry; and
  an instruction executing circuitry configured to execute the at least one instruction, wherein a buffer entry storing the information corresponding to the at least one instruction is updated to indicate that the at least one instruction has been executed to enable retiring the at least one instruction.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

Those skilled in the art should understand that the modules, circuitries, units or components of the device in the examples disclosed herein may be arranged in the device as described in the embodiments, or alternatively may be positioned in one or more devices different from the device. The modules, circuitries, units or components, may be combined into one module or, in addition, may be divided into a plurality of sub-modules.

In addition, those skilled in the art can understand that although some of the embodiments described herein include certain features included in other embodiments but not other features, the combination of features of different embodiments is meant to be within the scope of the present disclosure and form different embodiments.

As used herein, unless otherwise specified, the use of ordinal words "first," "second," "third," etc. to describe ordinary objects merely indicates different instances involving similar objects and is not intended to imply the objects described as such must have a given order in time, space, order, or in any other way.

the drawings and specification, there have been disclosed exemplary embodiments. Many variations and modifications, however, can be made to these embodiments. Accordingly, although specific terms are employed, they are used in a generic and descriptive sense only and not for purposes of limitation, the scope of the embodiments being defined by the following claims.

What is claimed is:

1. An instruction processing apparatus, comprising:
   an instruction decoding circuitry configured to decode a set of instructions;
   a reorder buffer comprising one or more buffer entries associated with the set of instructions, wherein:
   each buffer entry of the one or more buffer entries is configured to store information corresponding to at least one instruction of the set of instructions decoded by the instruction decoding circuitry,
   a buffer entry includes a single instruction counter indicating a number of instructions associated with the buffer entry, and
   the buffer entry is further configured to correspond to multiple instructions that are of a same or similar type that can be executed by a same instruction executing circuitry; and
   an instruction executing circuitry configured to execute the at least one instruction, wherein the buffer entry storing the information corresponding to the at least one instruction is updated to indicate that the at least one instruction has been executed to enable retiring the at least one instruction.

2. The instruction processing apparatus of claim 1, further comprising:
   an instruction retiring circuitry configured to retire the at least one instruction executed by the instruction executing circuitry, wherein in response to all instructions associated with the buffer entry having been executed, the instruction retiring circuitry is further configured to retire all the instructions associated with the buffer entry.

3. The instruction processing apparatus of claim 2, wherein:
   the at least one instruction is one of a plurality of instructions, and
   the buffer entry stores information corresponding to the plurality of instructions.

4. The instruction processing apparatus of claim 3, wherein:
   the instruction decoding circuitry is further configured to decode the plurality of instructions in one clock cycle; and
   the instruction retiring circuitry is further configured to retire the plurality of instructions in one clock cycle.

5. The instruction processing apparatus of claim 2, wherein the reorder buffer comprises:
   an entry creating position pointer indicating a position of a next buffer entry to be created; and
   an entry retiring position pointer indicating a position of a next buffer entry to be retired,
   wherein the instruction executing circuitry is further configured to create a buffer entry in a position indicated by the entry creating position pointer, and
   the instruction retiring circuitry is further configured to determine whether an instruction associated with a buffer entry in a position indicated by the entry retiring position pointer can be retired.

6. The instruction processing apparatus of claim 1, wherein for the at least one instruction, the reorder buffer is searched for existing buffer entries to find a buffer entry with available buffer space to store information corresponding to the at least one instruction, and in response to a buffer entry being found, the found buffer entry is updated to store the information corresponding to the at least one instruction.

7. The instruction processing apparatus of claim 1, wherein the buffer entry comprises a corresponding entry identifier, and the instruction decoding circuitry is further configured to acquire the entry identifier of the buffer entry storing information corresponding to the at least one instruction and send the entry identifier to the instruction executing circuitry along with the at least one instruction; and
   the instruction executing circuitry is further configured to update the buffer entry corresponding to the entry identifier in response to the execution of the at least one instruction being completed.

8. The instruction processing apparatus of claim 1, wherein the buffer entry comprises:
   an incomplete instruction counter indicating a number of instructions associated with the buffer entry that have not been executed.

9. The instruction processing apparatus of claim 8, wherein:
   the instruction decoding circuitry is further configured to set the incomplete instruction counter of the buffer entry to the number of the instructions associated with the buffer entry when the buffer entry is created; and
   the instruction executing circuitry is further configured to update the incomplete instruction counter of the buffer entry storing information of the number of instructions after the execution of one of the number of instructions is completed, wherein in response to the incomplete instruction counter of the buffer entry being updated to zero, the instruction retiring circuitry is configured to retire all instructions associated with the buffer entry.

10. The instruction processing apparatus of claim 1, wherein: the instruction decoding circuitry is further configured to send the set of instructions out of order to the instruction executing circuitry, wherein the set of instructions associated with the one or more buffer entries is retired in an order according to creation times of the one or more buffer entries in the reorder buffer.

11. The instruction processing apparatus of claim 1, wherein the buffer entry comprises:
    a state flag indicating whether the buffer entry is valid; and
    offset value information indicating a sum of offset values of the one or more instructions associated with the buffer entry.

12. An instruction processing method, comprising:
    decoding a set of instructions;
    storing, in a buffer entry of a reorder buffer, information corresponding to at least one instruction of the set of instructions that are decoded, wherein the reorder buffer comprises one or more buffer entries associated with the set of instructions,
wherein:
the buffer entry of the one or more buffer entries includes a single instruction counter indicating a number of instructions associated with the buffer entry, and
the buffer entry is further configured to correspond to multiple instructions that are of a same or similar type that can be executed by a same instruction executing circuitry;
executing the at least one instruction; and
updating the buffer entry storing the information corresponding to the at least one instruction to indicate that the at least one instruction has been executed to enable retiring the at least one instruction.

13. The instruction processing method of claim 12, further comprising:
retiring the at least one instruction executed by the instruction executing circuitry in response to all instructions associated with the buffer entry having been executed.

14. The instruction processing method of claim 13, wherein:
the at least one instruction is one of a plurality of instructions, and
the buffer entry stores information corresponding to the plurality of instructions.

15. The instruction processing method of claim 14, wherein:
decoding a set of instructions comprises decoding the plurality of instructions in one clock cycle; and
retiring all the instructions comprises retiring the plurality of instructions in one clock cycle.

16. The instruction processing method of claim 13, wherein the reorder buffer comprises:
an entry creating position pointer indicating a position of a next buffer entry to be created; and
an entry retiring position pointer indicating a position of a next buffer entry to be retired, wherein:
decoding a set of instructions comprises creating a buffer entry in a position indicated by the entry creating position pointer, and
retiring the at least one instruction comprises determining whether an instruction associated with a buffer entry in a position indicated by the entry retiring position pointer can be retired.

17. The instruction processing method of claim 12, wherein decoding a set of instructions further comprises:
for the at least one instruction, creating a buffer entry in the reorder buffer to store information associated with the at least one instruction.

18. The instruction processing method of claim 12, wherein decoding a set of instructions further comprises:
for the at least one instruction, searching the reorder buffer for existing buffer entries to find a buffer entry with available buffer space to store information corresponding to the at least one instruction, and in response to a buffer entry being found, the found buffer entry is updated to store information corresponding to the at least one instruction.

19. The instruction processing method of claim 12, wherein:
the buffer entry comprises a corresponding entry identifier;

decoding a set of instructions comprises acquiring the entry identifier of the buffer entry storing information corresponding to the at least one instruction; and
executing the at least one instruction comprises updating the buffer entry corresponding to the entry identifier in response to the execution of the at least one instruction being completed.

20. The instruction processing method of claim 12, wherein the buffer entry comprises:
an incomplete instruction counter indicating a number of instructions associated with the buffer entry that have not been executed.

21. The instruction processing method of claim 20, wherein:
decoding a set of instructions comprises setting the incomplete instruction counter of the buffer entry to the number of the instructions associated with the buffer entry in response to the buffer entry being created; and
executing the at least one instruction comprises updating the incomplete instruction counter of the buffer entry storing information corresponding to the number of instructions after the execution one of the number of instructions is completed, wherein in response to the incomplete instruction counter of the buffer entry being updated to zero, all instructions associated with the buffer entry is retired.

22. The instruction processing method of claim 12, wherein:
executing the at least one instruction comprises receiving the set of instructions out of order, wherein the set of instructions associated with the one or more buffer entries is retired in an order according to creation times of the one or more buffer entries in the reorder buffer.

23. The instruction processing method of claim 12, wherein the buffer entry comprises:
a state flag indicating whether the buffer entry is valid; and
offset value information indicating a sum of offset values of the instructions associated with the buffer entry.

24. A system on chip comprising:
an instruction processing apparatus, comprising:
an instruction decoding circuitry configured to decode a set of instructions;
a reorder buffer comprising one or more buffer entries associated with the set of instructions, wherein:
each buffer entry of the one or more buffer entries is configured to store information corresponding to at least one instruction of the set of instructions decoded by the instruction decoding circuitry,
a buffer entry of the one or more buffer entries includes a single instruction counter indicating a number of instructions associated with the buffer entry, and
the buffer entry is further configured to correspond to multiple instructions that are of a same or similar type that can be executed by a same instruction executing circuitry; and
an instruction executing circuitry configured to execute the at least one instruction, wherein the buffer entry storing the information corresponding to the at least one instruction is updated to indicate that the at least one instruction has been executed to enable retiring the at least one instruction.

25. An intelligent device comprising:
a system on chip, comprising:
an instruction processing apparatus, comprising:
an instruction decoding circuitry configured to decode a set of instructions;

a reorder buffer comprising one or more buffer entries associated with the set of instructions, wherein:
- each buffer entry of the one or more buffer entries is configured to store information corresponding to at least one instruction of the set of instructions decoded by the instruction decoding circuitry,
- a buffer entry of the one or more buffer entries includes a single instruction counter indicating a number of instructions associated with the buffer entry, and
- the buffer entry is further configured to correspond to multiple instructions that are of a same or similar type that can be executed by a same instruction executing circuitry; and an instruction executing circuitry configured to execute the at least one instruction, wherein the buffer entry storing the information corresponding to the at least one instruction is updated to indicate that the at least one instruction has been executed to enable retiring the at least one instruction.

* * * * *

UNITED STATES PATENT AND TRADEMARK OFFICE
CERTIFICATE OF CORRECTION

PATENT NO. : 11,467,844 B2
APPLICATION NO. : 17/024032
DATED : October 11, 2022
INVENTOR(S) : Chang Liu et al.

It is certified that error appears in the above-identified patent and that said Letters Patent is hereby corrected as shown below:

In the Claims

Claim 21, Column 22, Line 26, "entry is retired" should read as --entry are retired--.

Signed and Sealed this
Seventeenth Day of October, 2023

Katherine Kelly Vidal
*Director of the United States Patent and Trademark Office*